April 5, 1955 F. S. MILLER 2,705,629
BLOW TORCH MACHINE FOR BEVELING PIPE
Filed Aug. 1, 1951 3 Sheets-Sheet 1
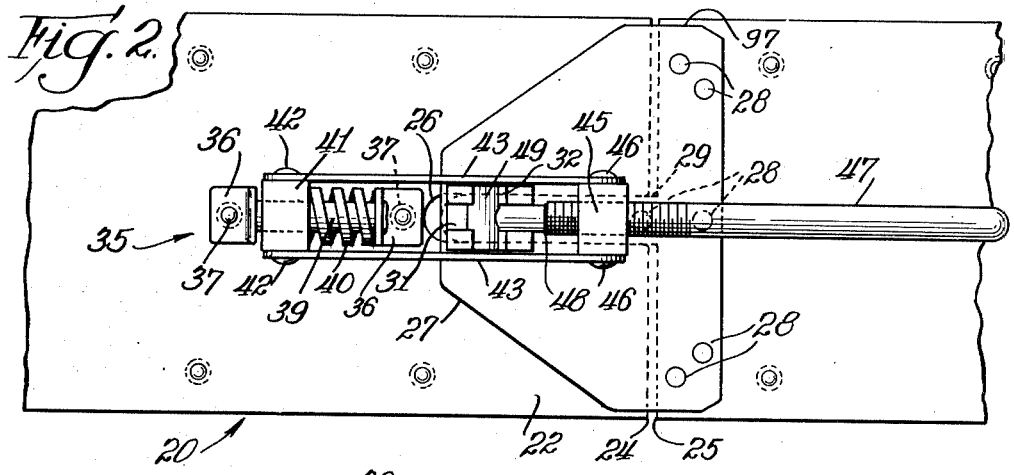
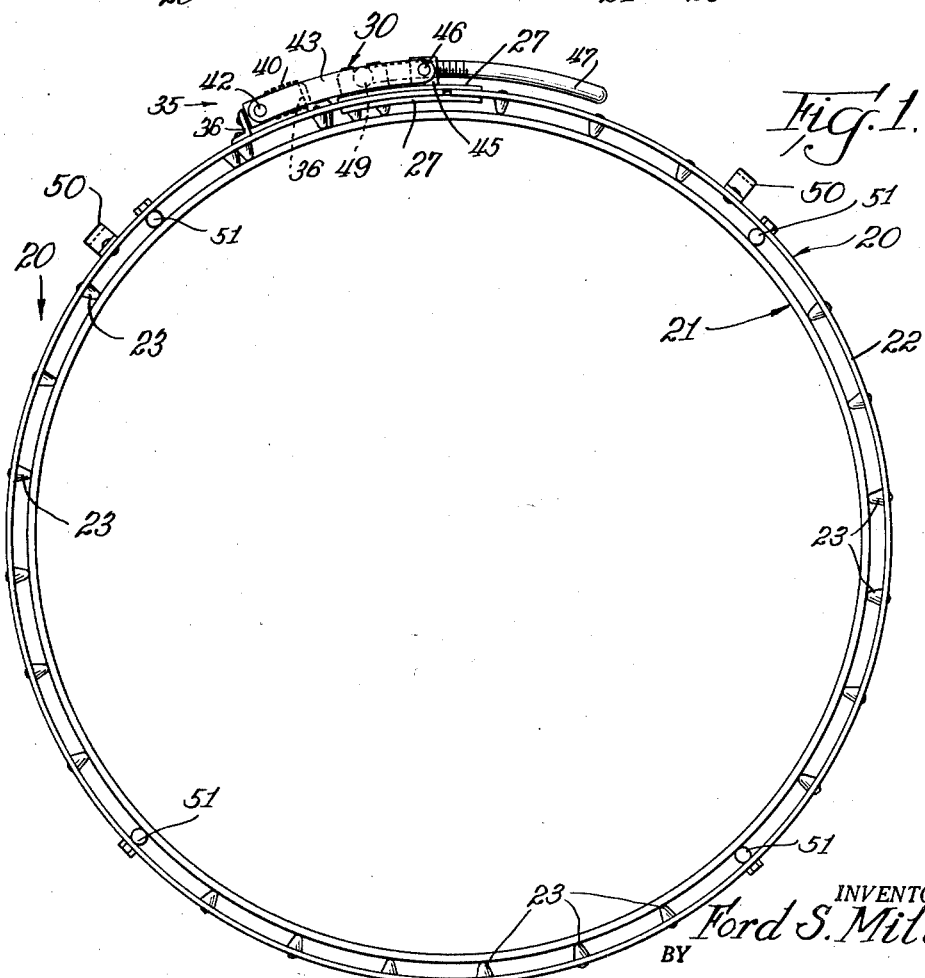
INVENTOR.
Ford S. Miller
BY
Owen, Jackson, Boettcher & Dienner
Attys.

April 5, 1955
F. S. MILLER
2,705,629
BLOW TORCH MACHINE FOR BEVELING PIPE
Filed Aug. 1, 1951
3 Sheets-Sheet 2
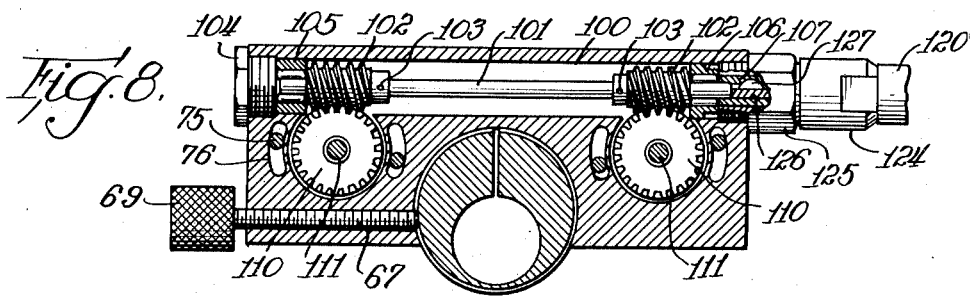
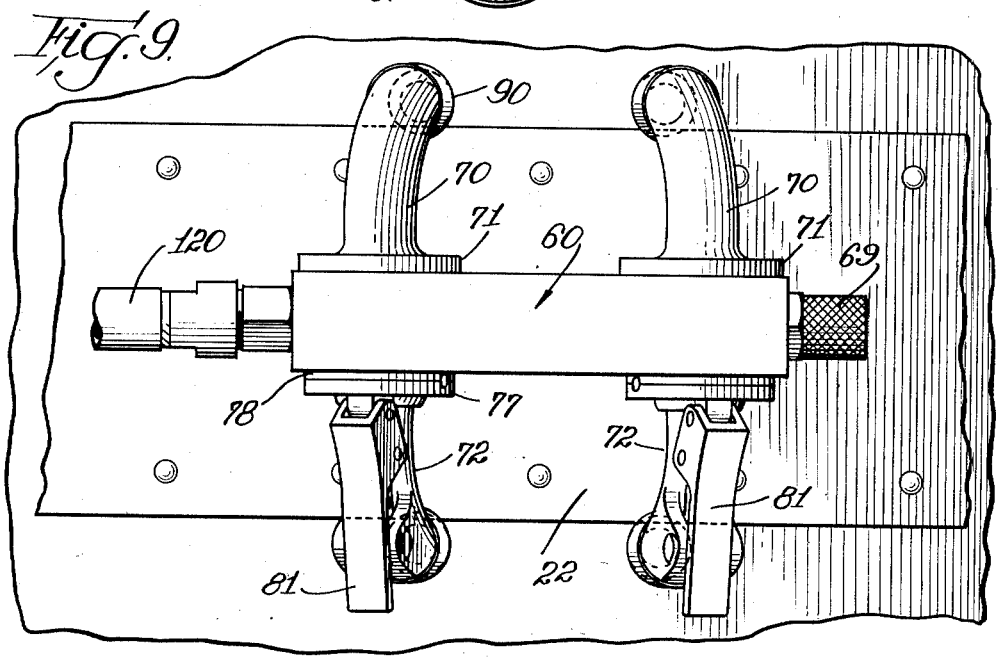
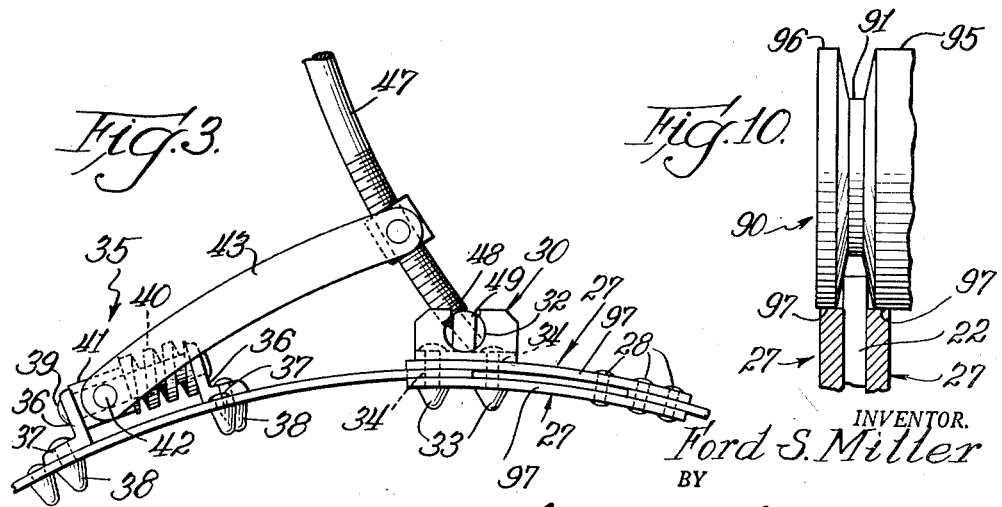
INVENTOR.
Ford S. Miller
BY April 5, 1955 F. S. MILLER 2,705,629
BLOW TORCH MACHINE FOR BEVELING PIPE
Filed Aug. 1, 1951 3 Sheets-Sheet 3
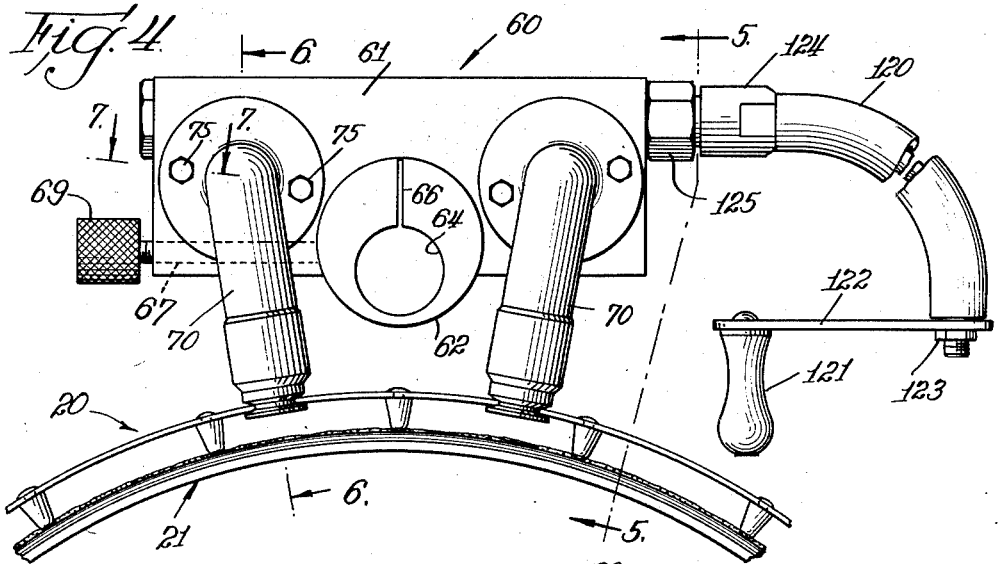
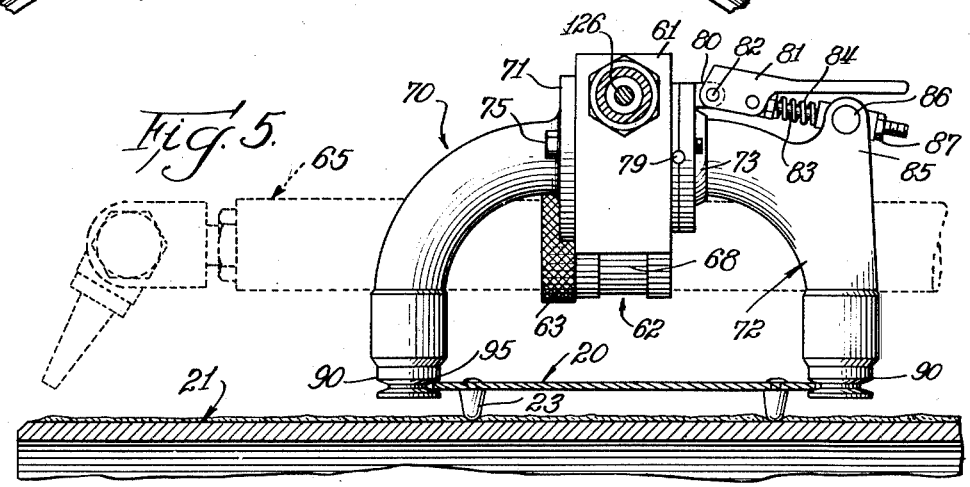
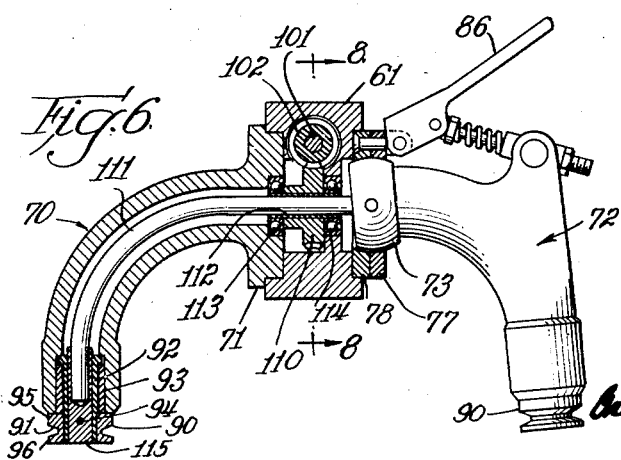
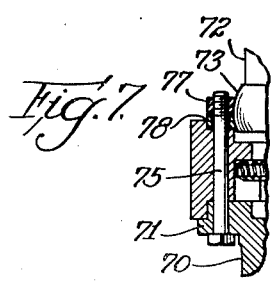
INVENTOR.
Ford S. Miller
BY United States Patent Office 2,705,629
Patented Apr. 5, 1955

2,705,629

BLOW TORCH MACHINE FOR BEVELING PIPE

Ford S. Miller, Winfield, Kans.

Application August 1, 1951, Serial No. 239,811

6 Claims. (Cl. 266—23)

My invention relates generally to a machine for cutting pipe and more specifically to a new improved machine for cutting a conical bevel edge transversely of large diameter metal pipe or tubing by means of a cutting torch or the like, with my present application comprising a continuation-in-part of my application Serial No. 180,209, filed August 18, 1950, now abandoned, and being directed to an improved and preferred embodiment of my invention thereover.

In the laying of large diameter pipe lines for carrying gas, oil or like fluids, such as are presently familiar in carrying gas and oil from the Southwest part of the United States to the Central and Eastern States, it is common practice to construct the pipe lines from interconnected sections of metal pipe which vary in diameter from 12″ to 36″ or larger, depending on the required carrying capacities of the pipe line. The several sections of pipe, under present practice, are laid end to end and their abutting ends welded together. In the preparation of the pipe ends for such welded connection, it is necessary to cut the abutting circumferential ends of the pipe at a conical bevel so that a sound welded joint may be made. At the same time, it is essential that the beveled edges so cut should lie absolutely transverse in relation to the pipe's longitudinal axis so that a true abutting fit may be made between adjacent pipe sections and their welded connection accomplished successfully. Since these pipe lines normally carry fluid under high pumping pressures, the importance of a tight and sound welded junction between adjacent pipe sections will be appreciated. Heretofore, there has been no completely successful apparatus for cutting such pipes in the above described manner, especially in the field where it is oftentimes necessary to cut the pipes in a narrow passage through rock or earth. Hand cutting with a torch, of course, is entirely too cumbersome and inaccurate for this required cutting operation. While others have presented devices to accomplish this type of pipe cutting, the expense and complexity of their operation have left much to be desired. The characteristics of the problem confronted in this operation more readily may be appreciated when it is recognized that a great degree of accuracy is involved in the successful cutting of these large diameter pipes. For instance, in cutting a 36″ diameter pipe, the absolute true transverse relation of the leading edge of the bevel cut, relative to the pipe's longitudinal axis, should be maintained substantially within $\frac{1}{64}$ of an inch. If the plane of the beveled cut is outside of this transverse limit, much time, money and labor is required to either recut the beveled edge or grind out the high spots along the cut to gain a truly transverse conical cut. The problem is further complicated by the fact that the piping itself is not always absolutely cylindrical or round so that the provision of a means utilizing the pipe's outer surface as a guide for holding the cutting torch at an optimum radial distance above the pipe's outer surface to gain an accurate and clean conical cut is complex. Further in the field, the pipe sections usually are "doped" or covered with an anti-corrosive outer coating consisting substantially of mixed tar and asbestos or the like, which makes an uneven and untrue cylindrical outer surface on the pipe which therefore is a poor surface to be used for bearing purposes. With conventional cutting machines, presently in use, and employing a rigid cutting track or fixture, the positioning thereof on such a "doped" pipe to gain an accurate cut, usually requires the removal of sections of the "doped" outer surface before the machine can be properly mounted to the pipe, this removal operation is costly and requires "redoping" of the pipe after the cutting machine is removed.

Briefly, I have devised a simple means for gaining a truly transverse cut of these large diameter pipes, comprising a flexible and expansible metal band or track mountable about the pipe, capable of accommodating irregularities in contour of the pipe while maintaining an accurate radial spacing of the track relative to the pipe's outer surface for insuring even cutting action by the torch and providing an encircling guide track along 360° of the pipe's circumference. A power driven torch carrier, having a plurality of rotatable wheels thereon engageable with the track, is mounted on the track so that the wheels run along and are guided by both edges or axial ends thereof. A hand crank means is used to drive the torch carrier at desired speeds in either direction about the track, to carry an oxy-acetylene torch along a truly transverse circumferential path above the pipe in making the desired conical bevel cut.

Among the many objects of my invention is that of presenting the workable features of a new and improved, light, compact, accurate and durable device for accomplishing accurately transverse cuts through larger diameter pipes by means of an oxy-acetylene torch or the like.

Another object of my invention is to demonstrate the features of a new and improved, flexible, expansible track means capable of surrounding a pipe at an even radial spacing thereabout for accurately maintaining the cutting tip of a cutting torch at a given optimum distance relative to the pipe's surface as the torch is moved along said track through 360° in girdling the pipe's circumference during the cutting operation.

Another object of my invention is to provide a track for a torch carrier capable of being mounted about a pipe and conforming to the exterior contour thereof for mounting and guiding a torch carrier through 360° thereabout during the cutting operation of the pipe.

Still another object of my invention is to provide a torch carrying device capable of adjustment to fit a guide track of different width and circumferences and which is so mounted on the track as to insure an accurate spacing of the cutting tip from the pipe to be cut.

A still further object of my invention is to provide a torch carrying device, capable of being moved positively about a flexible annular track and embodying a new and improved completely enclosed transmission arrangement for permitting the hand driving of said carrier along said track in either direction as desired.

The above and further objects, advantages and novel features and combinations of parts of my invention shall be recognized by one skilled in the art from the following description of my invention and with reference to the accompanying drawings illustrating one embodiment thereof.

In the drawings:

Figure 1 is a full side elevational view of my track means, looking at one edge thereof and showing its application to a pipe;

Figure 2 is a top plan view of a portion of my track means showing the details of the manner in which the ends thereof are interconnected;

Figure 3 is an enlarged partial side elevational view of my track showing the details of the fastening means shown in the plan view of Figure 2;

Figure 4 is a side elevational view of my carrier device in its mounted position on my track means;

Figure 5 is a view in end elevation of my carrier and track taken along lines 5—5 of Figure 4, looking in the direction of the arrows and illustrating the position of the cutting torch thereon as shown in phantom lines;

Figure 6 is an end elevational view of my carrier in partial cross section taken substantially along lines 6—6 of Figure 4, demonstrating the internal driving arrangement utilized for rotating the carrier wheels and showing the open position of the carrier legs to permit mounting and removal of the same from my track means;

Figure 7 is a broken away partial detailed cross sectional view taken substantially along lines 7—7 of Figure 4 and showing the details of mounting the ball and socket connection used in fastening two of the carrier legs to the transmission body;

Figure 8 is a full cross sectional view taken substantially along lines 8—8 of Figure 6 and showing the internal workings of my transmission arrangement for the carrier;

Figure 9 is a top plan view of my carrier as it appears mounted to a portion of the carrier track; and Figure 10 is an enlarged partial cross sectional view showing the engagement of one of the carrier wheels with my track as it passes the junction of the abutting ends thereof.

Track band

Referring now to the drawings and in particular to Figures 1–3 thereof, I have therein illustrated the particular features of one portion of my invention, namely my track band 20. As will be seen from Figure 1, my track band is to be mounted in concentric relation about a section of piping indicated at 21 and comprises a substantially rectangular elongated flexible metal band 22 provided with a plurality of spaced radially disposed and inwardly extending locating pins 23 each comprising a conical pointed pin member rigidly connected at its outer end to the inner face of the metal band 22 with a riveted connection or the like. From Figures 1 and 2, it will be recognized that the locating pins 23 are arranged in two rows around the band member 22, one adjacent each lateral edge thereof and spaced slightly inwardly therefrom. Intervals between adjacent locating pins in the same row are suitably regulated and preferably maintained uniform to provide the desired supporting of the band 22 required. It will be recognized from Figure 2 of the drawings that band member 22 terminates in two opposed end portions 24 and 25. Band member 22 is normally rolled to form a substantially cylindrical or annular ring for mounting the same transversely about a cylindrical pipe member 21. As illustrated in Figure 2 of the drawings, end portion 24 of band member 22 is provided with a centrally disposed slotted opening 26 while the opposite end portion 25 of the band is provided with a pair of registeringly aligned substantially triangular shaped, band adjusting plate members 27—27 positioned one below the other and on opposite sides of the band member 22 in a manner to project outwardly therefrom for receiving end portion 24 therebetween. The band locating plates 27 are curved to conform with the radius of band 22 and are suitably secured to the end 25 of the band by rivet members 28. The positioning of the adjusting plates 27 is symmetrical with respect to the lateral dimensions of the band member 22, so that the spacing of the lateral edges of the adjusting plates from the lateral or track edges of band member 22 is uniform on both sides of the band; the importance of which feature will be amplified later herein. Centrally disposed, intermediate the two locating plates 27, and formed integrally with, to extend centrally outwardly from, the end portion 25 of band member 22 is a central locating tongue member 29 of a size sufficient for its reception in the slotted opening 26 formed in end portion 24 of the band member; which opening 26 serves to guide the tongue 29 when the two ends of the band 22 are brought together by a suitable latch means.

Mounted substantially at the apexual end of the triangular shaped adjusting plates 27 and radially outward therefrom is a band latch anchor member 30 having a longitudinally extending slotted opening 31 formed centrally therealong and open at the upper side thereof, across which a transversely extending semi-circular opening 32 is formed centrally of the anchor member and likewise open at the upper side thereof for the pivotal inserted reception therein of one end of a latch mechanism, as will appear presently. Means for securing the anchor member 30 to the adjusting plates 27 comprise a pair of locating pins 33 similar in all respects to locating pin 23, heretofore described, with the exception that a central shank portion 34 thereof extends radially outward through both of the adjusting plates 27 and the locating tongue member 29 to communicate with the lower interior of the longitudinal rectangular slotted opening 31 of the anchor member 30. The shank portions 34 are then suitably riveted over at their outer ends, as illustrated in Figure 3, to form a rigid interconnection of the anchor member, adjusting plates and tongue member. The locating pins 33, in addition to the connective function described above, also serve as locating and supporting means intermediate the width of the band member 22 and adjacent the fastening of the two ends 24 and 25 thereof, as will be recognized hereinafter. From an inspection of Figures 2 and 3 it will be seen that the member 30 comprises one portion of a suitable latch mechanism for drawing the free ends of the track band 20 together. The other cooperating portion of the latch mechanism is indicated generally at 35 and includes a pair of spring anchor members 36—36 formed as right angularly bent brackets, each being rigidly connected to the band 22 by a short locating pin 38 (similar to locating pins 33). Brackets 36 are mounted in spaced apart relation adjacent to and in axial alignment with the slotted opening 26 in end portion 24 of the band member 22. A cylindrical spring anchor pin 39 is mounted through the two brackets 36 and supports a short, heavy compressive spring 40 therearound. The outer ends of the spring anchor pin 39 are suitably peaned over to hold such rigidly in relation to the spaced anchor brackets 36. A swivel block member 41 is also rotatably mounted on the spring pin member 39 adjacent one of the anchor brackets 36 with one face thereof in abutting engagement with one end of the compressive spring member 40. Two short trunnion posts 42 extend outwardly from opposite sides of the block member 41 for pivotally supporting one end of a pair of parallel spaced curvilinear latch fulcrum bars 43—43 thereon; the trunnion posts being suitably peaned over to prevent disconnection of the fulcrum bars therefrom. The fulcrum bars 43 are of a length substantially equal to the distance between the trunnion members 42 and the leading edge of the band end portion 24, and such are each imbued with a radial transverse curvature substantially in conformity to the radial curvature of the band member 22. Mounted at the opposite ends of the two spaced apart and arcuately movable fulcrum bars, in a manner similar to that utilized in mounting the fulcrum bars to the swivel block 41, is a transversely interreaching threaded block member 45 provided with trunnion posts 46—46, the outer ends of which are peaned over outwardly of each of the fulcrum bars 43 to provide swiveling connection therewith.

A centrally disposed axial threaded opening is formed through the block member 45 for the threaded reception and engagement with a threaded portion of a latch handle 47, which, like the fulcrum bars 43, is imbued with a radial curvature substantially conforming to that of band member 22. At one end 48 of the latch handle 47, a transversely disposed and rigidly connected latch pin 49 is provided, suitable for reception in the transversely extending cylindrical opening 32 formed in the anchor member 30. From Figure 3, in particular, it will be recognized that the pin 49 is substantially a rectangular block having a thickness equal to, or slightly smaller than the opening at the upper end of the cylindrical aperture 32 in anchor member 30, and that the lower and upper faces thereof are curved for sliding engagement and rotative movement in opening 32 in which it is inserted for operating the latch mechanism.

To provide an easy and convenient manner for handling my track band as disclosed above, I have mounted a pair of handle members 50—50 one near each end of the band, adjacent the interconnecting latch mechanism, as illustrated in Fig. 1.

In the construction of a track band, as heretofore described, it is contemplated that the bands shall be made in sizes conforming to the standard sizes of pipe encountered, which will normally consist of standard size piping ranging in diameters of 12 to 36 inches. Further, it will be recognized and appreciated that due to the flexible nature of the tranck band 20, the conformity thereof to irregularities in roundness of the pipe successfully can be overcome while maintaining a uniform and accurate radial spacing of the track band relative to the outside surface of the piping by means of the intervening and radial inwardly directed locating pins 23, 33, and 38. In this latter connection, it will be appreciated that the conical shaping of the locating pins 23 and their uniform spacing in a pair of coaxially spaced rows, one on either side of band member 22, permits axial stability of the track, and that penetration of a "doped" surface, conventionally employed on piping of the class to which my invention is directed, is easily gained, as shown in detail in Figure 5 of the drawing. Further, due to the presence of a spring member 40 in my latch arrangement, the track is circumferentially expansible to adapt such for mounting on pipe varying slightly in diameter from the standard diameter for which a given size band is designed. Further adjustment of the band's length is also provided by virtue of the threaded connection of the lever or latch handle 47 with the block member 45 which regulates the throw of the latch mechanism and the compression of spring 40. Additionally, since the full pressure of the latching force exerted by the latch means is concentrated intermediate the lateral edges of the track band 20 in tensioning the track band about a pipe, the depending locating pins 33 and 38 serve to provide adequate support directly underneath the latch mechanism to prevent lateral or axial buckling of the track band whereby holding pressure is distributed evenly across the band and to the several locating pins 23 for causing an even clamping action of the band around the pipe to which such is attached. Moreover, it is contemplated that in the bands of larger diameter, for instance a 36" diameter band, the axial length thereof will be sufficient to warrant the usage of several spaced cylindrical locating bars, reaching transversely or axially along the length of the band, as illustrated in Fig. 1 of the drawings at 51. The design of the locating bars 51 is cylindrical, and thereby an adequate penetration of the "doped" surface of the pipe is permitted under the exerting force of the latch mechanism so that a positive connection of the track band 20 with the pipe's surface is assured in this modified form of the track band as well.

It is obvious from the nature and construction of a track band, such as I have described above, that self-centering, accurate, and positive clamping thereof to a pipe is provided for, and that minor variations or rough spots in the contour of the pipe's outer surface are easily avoided by a spacing of the locating pins 23 on the pipe's surface to avoid such irregularity. This latter feature will be appreciated if the nature of the piping involved is considered, since many times such pipe is constructed of two half shells welded lengthwise together with a pair of longitudinally extending seams which are oftentimes rough and raised above the smooth cylindrical contour of the piping. Interference with such seams may be avoided in mounting my track by proper positioning of the locating pins relative to the seams.

*Torch carrier*

Having described the features and functioning of my track band, I shall now set forth the details and workings of my torch carrier 60 as illustrated in Figures 4–10 of the drawings. With particular reference to Figs. 4, 5, and 6 of the drawings, it will be recognized that the carrier 60 therein illustrated is adapted for mounting on the track band 20 for movement through 360° therealong in cutting and conically beveling a pipe 21. The carrier 60 includes a transmission housing 61 comprising a substantially rectangular-shaped metal block in which the working elements of the transmission drive are housed as will appear presently. Formed intermediate the length of the transmission housing 61 and communicating openly with the lower face thereof is a transversely extending, semi-cylindrical opening suitable for the reception of a torch holder 62 formed as a substantially cylindrical collar, one leading edge 63 of which is suitably provided with a knurled facing to assist in gripping the collar in the rotation thereof relative to the transmission housing 61. An eccentrically positioned cylindrical opening 64 extends through the holder member 62 for the reception thereof of the body member of a suitable oxy-acetylene torch, such as is shown in phantom lines at 65 in Figure 5 of the drawings. Communicating between one side of the eccentrically placed opening 64 of the collar and the outer face of the collar member 62 is a slotted aperture 66 utilized for permitting a squeezing closure of the collar member about the shank or body portion of the torch 65 under pressure exerted by a threaded bolt member 67 threadingly movable longitudinally in the body of the transmission housing 61. The bolt member 67 is adapted to engage a recessed cylindrical surface 68 formed intermediately of the length of the cylindrical holder member 62, as illustrated in Figure 5, to hold the same against rotation and to clamp the collar tightly on the torch body. Bolt member 67 is conveniently provided with a knurled knob 69 at its outer end to assist the user in the threading rotation thereof. By virtue of the engagement of one end of the bolt member with the recessed surface 68 of collar member 62, the problem of burring or defacing the body of the torch holder, which might prevent its withdrawal from the transmission housing 61, is alleviated. It will be recognized that the eccentric positioning of the cylindrical aperture 64 provided for receiving of the torch body makes it possible to regulate the vertical distance or positioning of torch member relative to the outer face of the pipe member 21, which is to be cut, by merely rotating the holder 62 in the transmission housing to a desired position.

Arranged in opposed pairs on opposite faces of the transmission housing 61, I have provided four hollow, downwardly curved leg members, two of which, numbered 70, are positioned on the same side of the transmission body 61 and are provided at their upper ends with outwardly flared flange members 71 and will therefore be termed hereinafter "flange legs." The opposite two legs 72 are mounted on the opposite face of the transmission body member 61 in paired registration with legs 70 and are provided at their upper ends with ball joints 73; such will therefore hereinafter be termed "ball legs." Interconnecting each of the flange legs registeringly with one of the ball legs are leg bolts 75, 75 reaching transversely of the transmission housing through a curvilinear slot 76, as shown in detail in Figure 8 of the drawings. To provide ball socket means whereby the ball legs 72 may move freely therein, a pair of annular ring plates 77 and 78 are provided, ring plate 78 fitting within a cylindrical recess formed in one face of the transmission housing 61, with the flanges 71 being mounted in a like manner on the opposite face thereof, as shown in Figures 6 and 7 of the drawings. The two ring plates 77 and 78 are to be fitted in adjacent face contacting relation with a key pin 79 keying the two together against relative rotational movement. It will be recognized that an internal central opening is formed in each of the ring plates 77 and 78, and such are cooperatively curved to form a suitable ball socket for the reception of the ball 73 associated with the ball leg members 72 mounted thereon. The leg bolts 75, of course, reach through the flanges 71 of the flange legs 70, and are threaded into the two ring plates 77 and 78 on the opposite side of the transmission housing 61, thereby tying the flanges and ring plates together for simultaneous rotational movement about an axis transverse to the longitudinal axis of the transmission housing, as shown in detail in Figure 7. When the pairs of legs 70 and 72 are thusly locked together by leg bolts 75, arcuate rotation thereof about an axis transverse of the transmission housing is permitted in a limited sense as restricted by the length of the arcuate openings 76 formed internally within the transmission housing, as seen in Figure 8 of the drawings. Further, it will be appreciated that the two legs of each cooperating pair of legs are insured of simultaneous arcuate movement and that the pairs of legs are movable independently of one another. Moreover, by providing the ball and socket type connection between the ball legs 72 and the transmission housing, vertical arcuate movement about an axis transverse to the axis of simultaneous arcuate rotation of the two legs of each pair is permitted for each of the ball legs, the purpose of which will be apparent presently.

As will be recognized from a study of Figures 5 and 6 of the drawings, the ball legs 72 are capable of assuming two limits of vertical arcuate movement, namely, that of a substantially vertical upright position as shown in Figure 5 wherein the legs are clamped to my track member 20, as will hereinafter be described, and that of an open or unclamped position as demonstrated in Figure 6. To accomplish the clamping of the ball legs in the closed or Figure 5 position, I have mounted an outwardly extending ear member 80 on each set of ring plates 77 and 78 which pivotally mounts a bifurcated end portion of a clamp lever 81 by means of a transversely extending pin member 82, this being shown in Figures 5 and 6. The clamp lever 81 is further pivotally connected to a rod member 83 which axially supports a compression coil spring 84. A pair of bifurcated ear members 85 are formed in tangential relation in an upwardly extending position from the curve of each of the ball legs 72 to receive a cross connecting pivotal pin 86 therethrough. Pin 86 is invaded by rod member 83 and suitable lock nuts 87 are utilized to regulate the throw of the lock linkage just described. It will be recognized that when lever 81 is thrown to a substantially horizontal position, each of the ball legs 72 associated therewith will be forced arcuately downward to assume a closed, or Figure 5 position, and conversely when lever 81 is thrown upwardly, as illustrated in Figure 6, the ball leg 72 associated therewith is permitted to move arcuately upward about its ball and socket connection with the transmission body member 61.

As seen in Figure 6 of the drawings, each of the legs for the carrier is provided with a rotatable wheel member 90 positioned at its lower end, such wheels being distinguished by a V-shaped receded annular groove 91 for engagement with the adjacent lateral edge or axial end of the track band 20, as illustrated in Figures 4 and 5 of the drawings. Each of the wheels 90 is mounted for rotation with an internal collar member 92 which is supported in a surrounding collar bearing member 93 insertedly received within a vertical cylindrical opening formed in the lower interior of each of the leg members. Mounting of the wheels on the flange legs 70 and the ball legs 72 is identical and four such wheels are provided, preferably as in the carrier illustrated. A transversely extending pin member 94 is utilized to fasten each of the wheels 90 with the collar member 92 associated therewith, as shown in the cross-sectional portion of Figure 6. It further will be recognized that each of the wheel members 90 is provided with a pair of cylindrical surfaces 95 and 96 forming the outer surface thereof and vertically bounding the V-shaped recessed portions 91 thereof, which cylindrical surfaces of each of the wheels is specifically designed to engage a lateral edge 97 of one of the band adjusting plates 27 as the carrier member moves across the break formed by the gap in the track band intermediate the ends 24 and 25 thereof, in a manner to be amplified later herein.

Referring more particularly to Figures 6 and 8 of the drawings, it will be recognized that the transmission body 61 is provided with a longitudinally extending opening 100, each end of which is threaded and in which is positioned a worm shaft 101. A worm 102, preferably having a double thread, is mounted at each end of the worm shaft 101 and secured for rotation therewith by means of a cross connecting pin member 103. At one end of opening 100 a threaded body plug 104 is provided to enclose the same and an end bearing member 105 is provided for rotatably supporting shaft 101 inwardly and adjacent plug member 104. At the opposite end of shaft member 101 a second bearing member 106 is provided to rotatably support that end of the shaft 101 and a cylindrical sleeve member 107 is pressed onto the remaining portion of the shaft member 101 to serve as a drive shaft connecting means, as will be amplified later herein.

Positioned in tooth engaging relation for rotation about an axis transverse of the transmission housing body 61 and the rotational axis of worm shaft 101 are a pair of worm gears 110, one placed below each of the worms 102 and supported for rotation with a flexible cable shaft member 111, as illustrated in Figure 6 of the drawings. A worm gear sleeve 112 is interposed between each of the worm gears 110 and the supporting flexible worm drive shaft 111. The flexible drive shafts 111 are each supported adjacent the worms 110, to which they are attached by suitable ball bearing members 113 and 114. Bearings 113 are supported in central axial openings formed in the flange members 71 of each of the flange legs 70, and bearings 114 are similarly housed by the transmission body 61 in suitable cylindrical openings formed for that purpose coaxially with the worm gears 110. From Figure 6 in particular, it will be recognized that the opposite ends of the flexible worm gear shafts 111 are each inserted through the hollow interior of one of the legs and are received in axial openings formed in the sleeve members 92, to which the rotatable wheels 90 are connected, whereby rotational movement of the flexible drive shafts 111 causes responsive rotational movement of the wheel members 90. Further, it will be recognized that shaft members 111 lie transversely to the worm shaft 101 and such are bent downwardly to follow the interior contour of the hollowed leg members 70 and 72 by virtue of which bending arrangement of the flexible drive shafts 111, the wheels supported on each of the flange legs 70 and the ball legs 72 rotate in opposite directions to provide positive driving actuation of the carrier member along the track band 20 as desired. Positive rotation of each of the wheels 90 in response to rotational movement of the flexible drive shafts 111 is insured by pin members 94 which extend through the wheels 90, supporting sleeve members 92 and tip portions 115 comprising the outer ends of the flexible drive shafts 111.

As seen in Figure 4 of the drawings, a flexible drive cable 120 is provided to supply driving actuation of worm shaft 101. The drive cable 120, having a rotatable core, is provided at its outer end with a crank means comprising a handle 121 interconnected with the cable 120 by a crank arm 122 and a locking nut 123. Connection of the cable 120 with the transmission is provided by means of a conventional locking collar 124 mounted at the opposite end thereof from handle 121, which collar is threadingly received about a threaded portion of a drive shaft connector 125 distinguished by a polygonal wrench engaging outer surface. Referring again to Figure 8 of the drawings, it will be seen that the core 126 of the cable member 120 is insertedly received within the drive shaft core connector member 107 which surrounds the right hand end of worm shaft 101, as viewed in that figure. Locking engagement for positively driving shaft 101 upon rotation of cable core 126 in response to turning of the crank means at the outer end thereof, is insured through a key member 127, interconnecting the cable core 126 with the core connector 107. Cable 120 is designed to be removably mounted to the transmission housing 61 via the connector member 125 for convenience in transportation and storage. As it will be recognized from the description of the transmission construction, such is capable of driving the wheel members 90 and, consequently, carrier member 60 about the track band 20 in either direction as desired, depending on the direction of rotating the crank means comprising the handle member 121 and arm 122.

*Use and operation*

Having thus described the various elements and their association and combination in the embodied form of my invention illustrated in the drawings, the use and operation thereof will hereinafter be set forth.

To cut a pipe 21 as illustrated in Figure 1 of the drawings, the operator first places the track band 20 thereabout with the clamping means associated therewith in an open condition whereby the track band is untensioned. After positioning the band at the desired position around pipe 21, handle member 47 of the band latch means is moved arcuately downward into a position of substantial parallelism with the exterior contour of the track band. This actuation of the handle member 47 serves to tightly draw the track band around the pipe member as desired, with the various locating pins 23, 33 and 38 serving to center the band properly on the pipe and maintain a uniform radial spacing of the track band relative to the surface of the piping. Provision of the spring member 40 and the threading adjusting of handle member 47 in the block member 45 relative to the latch means utilized for drawing the ends of the track band together, permit adjustable variations in the size of the track band to adapt such for piping of various diameters neighboring the standard diameter for which the particular band is designed. As illustrated in Figure 5 of the drawings in particular, upon tightening of the track band 20 about the pipe member 21, the locating pins 23, 33, and 38 penetrate the outer "doped" covering on the pipe to give a firm engagement with the outer surface of the pipe to be cut. Further, by the provision of laterally spacing the separate rows of locating pins 23, lateral or axial stability of the track band is insured, giving a desired and necessary steady location and positioning of the track band about the pipe. Having drawn the track band 20 tightly about the pipe as described, the carrier means 60 is mounted thereon with the ball legs 72 being in their raised position, as illustrated in Figure 6 of the drawings. With wheels 90 associated with the flanged legs 70 of the carrier means engaging one edge of the track band 20 in the V-shaped grooves 91 thereof, the ball legs 72 are likewise engaged tightly with the track band, but on the opposite sides thereof, and locked in position by depressing levers 86 associated with the clamping means mounted between the upper ends of the ball legs and the transmission housing 61. The oxyacetylene torch is then mounted in the collar member 62 which is inserted in the opening provided therefor in the mid-section of the transmission housing 61. Vertical adjustment of the tip of the oxy-acetylene torch relative to the pipe surface is then regulated by rotational movement of the torch carrier 62 relative to the transmission housing, and after the desired vertical adjustment has been reached the torch carrier or collar member is locked in position by engaging the inner end of the locking bolt 67 tightly therewith. As will be recognized from Figure 5, the oxy-acetylene torch 65 is preferably of a type having a swivel or adjustable head whereby the desired angle of bevel cut is gained, and this angle is usually adjusted prior to the engagement or insertion of the torch in the torch carrier means 62. The drive cable 120 is then engaged with the transmission, as described heretofore, and the crank means associated therewith is rotated as desired positively to move the carrier along the track band. As mentioned heretofore, movement of the carrier in either direction as desired is easily gained depending on the direction of rotation of the crank means and the drive cable 120.

In operation I have found it practical and desirable to provide the cable 120 with a length of approximately 9 feet so that the operator is free of danger from the burning flame of the torch and is able to observe the cutting without having to lean over the torch for close observation while maintaining the operation of the carrier. It should also be recognized that in the positioning of the carrier on the track band, the pairs of legs 70 and 72 are adjusted angularly as demonstrated in Figures 4 and 9, to assume the radius of the mounted track band so that the wheels 90 thereon lie in radial or true transverse relation to the surface of the track band. This adjustment is normally checked prior to cutting with the torch to insure that the carrier is movable evenly along the track and that the lateral edges thereof are properly engaged with the drive wheels 90, as illustrated in Figure 10 of the drawings. It further will be appreciated that as the carrier 60 passes the gap intermediate the abutting ends 24 and 25 of the track band, normally the wheels 90 would disengage from the track band as the gap is reached to permit inward radial movement of the carrier, at one end at least, during the passage over such a gap. This would spoil the cut being made. To prevent the carrier's inward radial movement relative to the track band, upon reaching the gap therein, I have provided secondary shoulders 95 and 96 on the drive wheels 90, which surfaces are of a larger diameter than the engaging diameter of the V-shaped groove 91 therein. Therefore, upon reaching the gap area in the track band, the cylindrical surfaces 95 and 96 of the wheels engage the adjacent edges of the adjusting plates 27 mounted above and below end 25 of the track band as illustrated in Figure 10, and thusly guide and drive the carrier across the gap with a steady movement.

It will thus be seen that the bevel cutter set forth and described hereabove provides an accurate and positive means for cutting a conical beveled edge on a pipe as desired with the carrier means thereof moving about and over the guiding track band so that continuous and full 360° circumvention of the pipe to be cut is made possible. Of course, the exact speed of movement is regulated by the operator who observes the cutting progress of the torch and such is determined by the speed of rotating the crank means associated with the free end of the drive cable 120.

Having thus described the details of construction and operation of my pipe bevel cutter, it will be appreciated that numerous changes, modifications, and substitutions of equivalents may be made in the particular embodiment herein illustrated and described without departing from the spirit and scope of my invention. I therefore do not wish to be limited to the specific embodiment herein set forth except as may appear in the following appended claims.

I claim:

1. A pipe beveling machine of the class described, comprising in combination, a flexible, open-ended, annular track band conformable to the exterior contour of a pipe about which such is to be mounted, plate means bridging the ends of said band and providing secondary lateral edges in spaced parallism to the lateral edges of said band, a plurality of spaced, radially inwardly projecting locating pins mounted on said band for spacing the latter at a uniform radial distance outwardly of said pipe, detachable latch means interjoining the free ends of said band, spring means on said latch means for permitting circumferential expansion of said band and tensioning the same in its mounted condition on said pipe, a torch carrier mountable on said track band for encircling said pipe and having a plurality of rotatable drive wheel members lockingly engageable with the lateral edges of said band and said plate means, means for adjustably supporting a cutting torch on said carrier at a uniform radial distance outwardly of said pipe's exterior, and a manually powered reversible transmission for simultaneously driving said wheels to move said carrier 360° about said track in either direction as desired.

2. In a pipe beveling machine of the class described, the combination comprising, a flexible, annular, open-ended metal spring-like track band capable of encircling a pipe to be cut, locating means projecting radially inwardly of said band for positioning said band transversely of the longitudinal axis of said pipe and spacing the same uniformly radially outwardly thereof, means for matingly aligning the opposite free ends of said band, adjustable latch means arranged to draw said band's free ends toward one another, thereby to tension said band about said pipe, plate means overlapping the ends of said band and having edge portions paralleling the edges of said band to provide alternate track means bridging the gap between the band ends, a carrier means having a central transmission housing adapted to travel along said band about said pipe, an eccentric collar member mounted transversely of said housing for supporting adjustably a cutting torch therein, leg members projecting outwardly and downwardly from opposite sides of said housing and bridging the width of said band, wheel members rotatably mounted at the lower ends of each of said legs and having annular grooves formed therein for driving engagement with opposite lateral edges of said band and additional surfaces for drivingly engaging the edges of said plate means, power transmission means within said housing for simultaneously rotating said wheels, the wheels on one side of said housing rotating in an opposite direction from the wheels on the other side of said housing; latch means connecting certain of said legs with one side of said housing and adapting the same for arcuate movement toward and away from said other legs to effect engagement and disengagement of said wheels with said band edges, and mounting means interconnecting in pairs, one of said certain legs with one of said other legs and adapting said pairs of legs, so associated, for simultaneous coaxial and limited rotary movement about an axis transverse of said housing whereby said legs are adjustable for a true radial positioning relative to the outer surface of said annular track band to permit locking engagement of said wheels with said track band edges.

3. In a pipe end beveling machine, the combination of a torch carrier having means to carry a beveling torch, coplanar pairs of hollow legs extending outwardly and downwardly from opposite sides of said carrier and adjustable for disposition radially of the axis of the pipe to be beveled, a grooved drive wheel rotatably mounted at the lower end of each of said legs, such wheels being arranged for driving engagement with opposite edges of a flexible annular track band concentrically encircling the pipe, worm and worm wheel means housed in said carrier, flexible shaft means having driving connection with said worm and worm wheel means and extending through each pair of said hollow legs transversely of said carrier for rotatably driving the drive wheels, and means for driving said worm and worm wheel means to simultaneously rotate said drive wheels in unison to move said carrier along said track.

4. For use with a cutting torch carrier in bevel cutting a pipe end, a curvilinear, open-ended, track band comprising a relatively wide length of thin flexible spring material adapted to encircle a pipe, a plurality of rigid spacing pins extending radially inward of the inner surface of said band for engaging the exterior of said pipe, said pins serving to space said band uniformly from said pipe's exterior leaving the lateral edges of the band free and unobstructed, plate members overlapping the opposed ends of said band; the lateral edges of said plate members being in offset parallelism with the lateral edges of said band to provide track portions which cooperate with the lateral edges of said band to provide a pair of parallel spaced unobstructed tracks continuous through 360° for driving engagement by grooved roller wheels of said carrier.

5. In combination, a length of thin, relatively wide, flexible spring material formed as an open ended track band adapted to encircle a pipe to be bevel cut at its ends, means for spacing said band uniformly radially outward from the exterior of said pipe, latch means for interjoining the free ends of said band and tensioning such about said pipe, plate means overlapping the opposed open ends of said band and bridging the gap therebetween, the lateral edges of said plate means being in spaced parallelism with the lateral edges of said band for forming therewith a pair of spaced tracks continuous through 360°, and a torch carrier mountable radially outward of said track band for movement therealong, said carrier bridging the width of said band and having a plurality of rotatably driven drive wheels lockingly engageable with the said two tracks, the drive wheels each having an annular V-shaped groove formed thereabout for driving engagement with a track edge of said band and additionally having a cylindrical shoulder portion formed adjacent said groove thereof for engaging a lateral edge of said plate means to propel said carrier across the gap between the free ends of said band.

6. In combination with a flexible flat band adapted to encircle a pipe, the end of which is to be beveled, spacing means between the band and the pipe leaving the lateral edges of the band unobstructed, a torch carrier having a body supporting at least one fixed leg extending from one side thereof and at least one hinged leg extending from its opposite side, said fixed and hinged legs depending toward the band and arranged in coplanar pairs for conjoint rotation relative to said carrier body, grooved rollers embracing opposite lateral edges of the band, one rotatably carried at the lower end of each of said legs, the axes of the rollers being disposed substantially radially of the axis of the pipe to be beveled when engaged with said band edges by rotatably adjusting said leg pairs relative to the carrier body, at least one worm wheel rotatably mounted in the body of said carrier, flexible driving shaft means connecting the worm wheel to the rollers at the ends of each pair of legs, a rotatable drive shaft section rotatably mounted in the carrier, and a worm meshing with said worm wheel, said worm being carried by said shaft section.

References Cited in the file of this patent

UNITED STATES PATENTS

| 1,162,587 | Eimann | Nov. 30, 1915 |
| 1,646,129 | Wagner | Oct. 18, 1927 |
| 1,981,340 | Anderson | Nov. 20, 1934 |
| 2,021,441 | Brown | Nov. 19, 1935 |
| 2,334,301 | Young | Nov. 16, 1943 |
| 2,459,823 | Lebedeff | Jan. 25, 1949 |

FOREIGN PATENTS

| 139,326 | Great Britain | Mar. 4, 1920 |
| 523,573 | Great Britain | July 17, 1940 |
| 212,921 | Germany | Aug. 14, 1909 |